United States Patent
Richards et al.

(10) Patent No.: US 6,674,396 B2
(45) Date of Patent: Jan. 6, 2004

(54) SYSTEM AND METHOD FOR DISTANCE MEASUREMENT BY INPHASE AND QUADRATURE SIGNALS IN A RADIO SYSTEM

(75) Inventors: James L. Richards, Fayetteville, TN (US); Larry W. Fullerton, Brownsboro, AL (US)

(73) Assignee: Time Domain Corporation, Huntsville, AL (US)

( * ) Notice: Subject to any disclaimer, the term of this patent is extended or adjusted under 35 U.S.C. 154(b) by 0 days.

(21) Appl. No.: 09/960,278

(22) Filed: Sep. 21, 2001

(65) Prior Publication Data

US 2002/0118132 A1 Aug. 29, 2002

Related U.S. Application Data

(63) Continuation of application No. 09/482,681, filed on Jan. 14, 2000, now Pat. No. 6,295,019, which is a continuation of application No. 09/083,993, filed on May 26, 1998, now Pat. No. 6,111,536.

(51) Int. Cl.[7] .......................... G01S 13/76; G01S 13/00
(52) U.S. Cl. ...................... 342/125; 342/118; 342/194; 342/195
(58) Field of Search ................................ 342/118, 125, 342/175, 194, 195, 134, 135, 27, 28, 29–32, 450, 458, 463–465; 356/4.01, 5.01, 5.05, 5.08, 5.09

(56) References Cited

U.S. PATENT DOCUMENTS

| | | | | |
|---|---|---|---|---|
| 2,716,236 A | * | 8/1955 | Reinish et al. | 342/134 |
| 3,614,226 A | * | 10/1971 | Vergoz | 356/5.08 |
| 3,816,832 A | * | 6/1974 | Elwood | 342/458 |
| 4,107,674 A | * | 8/1978 | Funatsu et al. | 342/32 |
| 4,620,788 A | * | 11/1986 | Giger | 342/135 |
| 5,363,108 A | * | 11/1994 | Fullerton | 342/27 |
| 6,040,898 A | * | 3/2000 | Mrosik et al. | 356/5.09 |
| 6,111,536 A | * | 8/2000 | Richards et al. | 342/125 |
| 6,295,019 B1 | * | 9/2001 | Richards et al. | 342/125 |

* cited by examiner

*Primary Examiner*—Bernarr E. Gregory
(74) *Attorney, Agent, or Firm*—Venable LLP; Robert S. Babayi

(57) ABSTRACT

A system and a method for distance measurement utilizes a radio system. The distance is measured by determining the time it takes a pulse train to travel from a first radio transceiver to a second radio transceiver and then from the second radio transceiver back to the first radio transceiver. The actual measurement is a two step process. In the first step, the distance is measured in coarse resolution, and in the second step, the distance is measured in fine resolution. A first pulse train is transmitted using a transmit time base from the first radio transceiver. The first pulse train is received at a second radio transceiver. The second radio transceiver synchronizes its time base with the first pulse train before transmitting a second pulse train back to the first radio transceiver, which then synchronizes a receive time base with the second pulse train. The time delay between the transmit time base and the receive time base can then be determined. The time delay indicates the total time of flight of the first and second pulse trains. The time delay comprises coarse and fine distance attributes. The coarse distance between the first and second radio transceivers is determined. The coarse distance represents the distance between the first and second radio transceivers in coarse resolution. An inphase (I) signal and a quadrature (Q) signal are produced from the time delay to determine the fine distance attribute. The fine distance indicates the distance between the first and second transceivers in fine resolution. The distance between the first and second radio transceivers is then determined from the coarse distance and the fine distance attributes.

27 Claims, 8 Drawing Sheets

SYSTEM AND METHOD FOR DISTANCE MEASUREMENT BY INPHASE AND QUADRATURE SIGNALS IN A RADIO SYSTEM

CROSS REFERENCE TO RELATED APPLICATIONS

This is a continuation of U.S. patent application Ser. No. 09/482,681, filed Jan. 14, 2000, now U.S. Pat. No. 6,295,019, which is a continuation of U.S. patent application Ser. No. 09/083,993, filed May 26, 1998, now U.S. Pat. No. 6,111,536.

BACKGROUND OF THE INVENTION

1. Field of the Invention

The present invention generally relates to distance measurement, and more specifically to a system and method for distance measurement by inphase and quadrature signals in a radio system.

2. Related Art

Distance measurement systems are required in a wide variety of applications. Surveying, position determination, precision farming and mining are some example applications that require distance measurement systems.

In recent years, various systems for distance measurement systems have been developed. The global positioning satellite (GPS) system operated by the United States Department of Defense, for example, is a highly complex system of determining the position of an object by distance measurement. The GPS system depends on measuring the time-of-flight of signals from three or more orbiting satellite transmitters by a navigation receiver. According to the GPS system, each satellite broadcasts a time-stamped signal that includes the satellite's ephemeris, i.e., its own position. When the mobile unit receives a GPS signal, the mobile unit measures the transmission delay relative to its own clock and determines the distance from the transmitting satellite's position.

Another approach is that employed by the U.S. Navy's TRANSIT system. In that system, a mobile unit performs continuous doppler measurements of a signal broadcast by a low earth orbit (LEO) satellite. The measurements continue for several minutes. The system usually requires two passes of the satellite, necessitating a wait of more than 100 minutes. In addition, because the distance and position calculations are performed by the mobile unit, the satellite must broadcast information regarding its position, i.e., its ephemeris. Although the TRANSIT system is capable of high accuracy (on the order of one meter), the delay required is unacceptable for commercial applications.

Although these systems accurately measure the distance between objects, they are extremely complex, and, more importantly, expensive to implement. For example, both the GPS and TRANSIT systems require multiple satellites, sophisticated receivers and antennas that require hundreds of millions dollars of investments. Also, response times of GPS and TRANSIT systems are typically slow due to their narrow bandwidth. Furthermore, since these systems depend on orbiting satellites, they require an unimpeded view of the sky to effectively perform range measurement. For these reasons, it has been recognized that there is a need for a simple, low cost distance measurement system.

SUMMARY OF THE INVENTION

The present invention is directed to a system and a method for distance measurement using a radio system. According to the present invention, a distance is measured by determining the time it takes a pulse train to travel from a first radio transceiver to a second radio transceiver and then from the second radio transceiver back to the first radio transceiver.

The actual measurement is a two step process. In the first step, the distance is measured in coarse resolution, and in the second step, the distance is measured in fine resolution.

In accordance with the present invention, a first pulse train is transmitted using a transmit time base from the first radio transceiver. The first pulse train is received at a second radio transceiver. The second radio transceiver synchronizes its time base with the first pulse train before transmitting a second pulse train back to the first radio transceiver. The second pulse train is received at the first radio transceiver, which then synchronizes a receive time base with the second pulse train.

The time delay between the transmit time base and the receive time base can then be determined. The time delay indicates the total time of flight of the first and second pulse trains. The time delay comprises coarse and fine distance attributes.

The coarse distance between the first and second radio transceivers is determined. The coarse distance represents the distance between the first and second radio transceivers in coarse resolution. An inphase (I) signal and a quadrature (Q) signal are produced from the time delay to determine the fine distance attribute. The fine distance indicates the distance between the first and second transceivers in fine resolution. The distance between the first and second radio transceivers is then determined from the coarse distance and the fine distance attributes.

Further features and advantages of the present invention, as well as the structure and operation of various embodiments of the present invention, are described in detail below with reference to the accompanying drawings.

BRIEF DESCRIPTION OF DRAWING

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE EMBODIMENTS

Overview of the Invention

Figure 1:
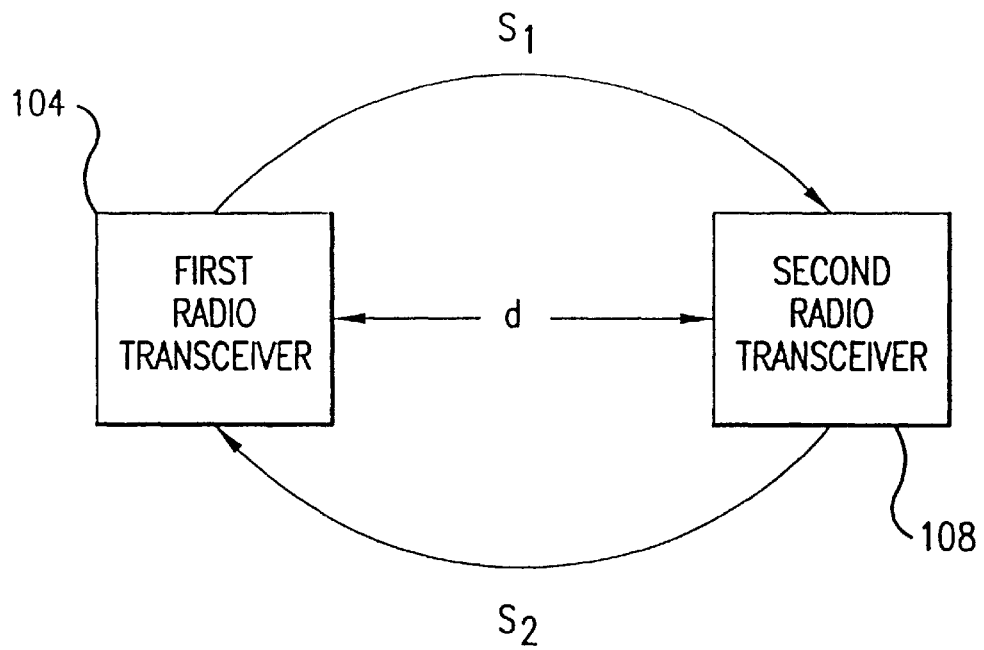
FIG. 1 illustrates two radio transceivers that are used for distance measurement in accordance with one embodiment of the present invention.

The present invention is directed to a system and a method for distance measurement using a radio system. The present invention can be used to measure the distance between a plurality objects.

Briefly stated, the key to measuring a distance according to the present invention is to precisely measure the time it takes for a single bit to travel from a first radio transceiver to a second radio transceiver. Since in reality it is difficult to transmit and receive a single bit, the distance is measured by determining the time it takes a pulse train to travel from a first radio transceiver to a second radio transceiver and then from the second radio transceiver back to the first radio transceiver. Stated in other terms, the distance is measured by determining the travel time for a complete exchange of data between the first and second radio transceivers.

The actual distance measurement is a two step process. In the first step, the distance is measured in coarse resolution, also referred to as a coarse measurement. In the second step, the distance is measured in fine resolution, also referred to as a fine measurement. Alternatively, the coarse distance and the fine distance can be measured in parallel, or the fine distance can be measured before the coarse distance is measured.

The radios utilized in the present invention may be any one of several types of radios that are capable of transmitting and receiving coded or modulated signals. The modulation can be time or phase modulation, frequency modulation, amplitude modulation, code division multiplex or time division multiplex schemes. It will be apparent to persons skilled in this art that other types of modulation schemes can be easily implemented.

In the following description, an impulse radio system comprising a plurality of transceivers are used for distance measurement. However, it should be understood that impulse radios are chosen as an example only. It will be apparent to persons skilled in the art that the present invention can be implemented easily by other types of radio systems. Furthermore, the present invention also be implemented using optical signals from a laser, light emitting diode (LED) or other types of optical source.

Impulse radio has been fully described in a series of patents, including U.S. Pat. No. 4,641,317 (issued Feb. 3, 1987), U.S. Pat. No. 4,813,057 (issued Mar. 14, 1989), U.S. Pat. No. 4,979,186 (issued Dec. 18, 1990) and U.S. Pat. No. 5,363,108 (issued Nov. 8, 1994) to Larry W. Fullerton. A second generation of impulse radio patents include U.S. Pat. No. 5,677,927 (issued Oct. 14, 1997), U.S. Pat. No. 5,687,169 (issued Nov. 11, 1997) and co-pending application Ser. No. 08/761,602 (filed Dec. 6, 1996) now U.S. Pat. No. 5,832,035, and Ser. No. 09/045,929 (filed Mar. 23, 1998) now U.S. Pat. No. 6,133,876 to Fullerton et al. These patent documents are incorporated herein by reference.

The Present Invention

The preferred embodiments of the invention are discussed in detail below. While specific steps, configurations and arrangements are discussed, it should be understood that this is done for illustrative purposes only. A person skilled in the relevant art will recognize that other steps, configurations and arrangements can be used without departing from the spirit and scope of the present invention.

FIG. 1 illustrates two radio transceivers 104 and 108 that can be used for distance measurement according to one embodiment of the present invention. The first radio transceiver 104 is spaced at a distance d from the second radio transceiver 108. The first radio transceiver 104 has two time bases, a transmit time base and a receive time base. The second radio transceiver 108 requires only a time base, although, it can also have two time bases. Other transceiver arrangements in which the present invention can be used for position determination are described in a co-pending application Ser. No. 09/045,929 (filed Mar. 23, 1998), titled: System and Method for Position Determination by Impulse Radio, now U.S. Pat. No. 6,133,876, Referring now to FIGS. 1 and 2, the first radio transceiver 104 transmits a pulse train $S_1$ using the transmit time base. The pulse train $S_1$ has N pulses, where N is an integer. The second radio transceiver 108 receives the pulse train $S_1$ and synchronizes its time base with the pulse train $S_1$. The second radio transceiver 108 then transmits a pulse train $S_2$ having N pulses. The pulse train $S_2$ is received by the first radio transceiver 104. The transceiver 104 synchronizes its receive time base with the pulse train $S_2$. The time delay between the transmit time base and the receive time base is then determined. The time delay represents the total time taken for the round trip flight from the first radio transceiver 104 to the second radio transceiver 108 and back to the first radio transceiver 104.

Figure 2:
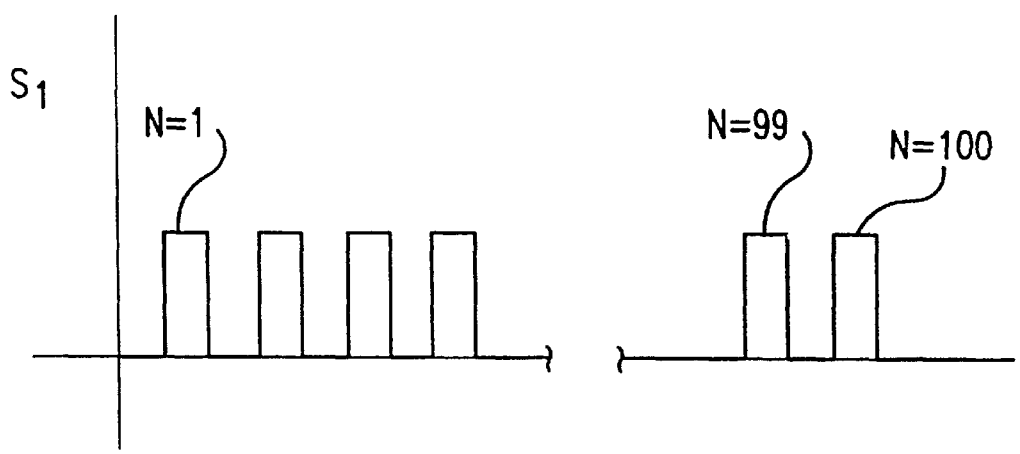
FIG. 2 illustrates an example pulse train.

FIG. 2 illustrates an example pulse train $S_1$ (or $S_2$) according to one embodiment. The pulse train $S_1$ (or $S_2$) comprises 100 pulses. Each individual pulse has an exemplary pulse width of 50 nano seconds. The total width of the pulse train $S_1$ (or $S_2$) is 10 micro seconds. The pulse train $S_1$ (or $S_2$) is periodic, having a period of 30 micro seconds. Stated in other terms, the pulse train $S_1$ or ($S_2$) is repeated at every 30 micro seconds interval. The duty cycle of the pulse train $S_1$ (or $S_2$) is 0.333.

The pulse train can be envisioned in both time and space by considering the speed of radio waves in the atmosphere and the frequencies involved. The pulse train is generated by a 10 MHz signal source (described below in detail). Since electromagnetic wave travels at a speed of approximately 100 ft/nano second, a 10 MHz signal source will generate a pulse for each 100 ft of travel by the wave. Consequently, if a 10 MHz oscillator is used to trigger a counter to count the distance traveled by a pulse train, the counter can measure a distance within approximately 50 ft resolution by detecting the rising edge or the falling edge of the clock.

Figure 3:
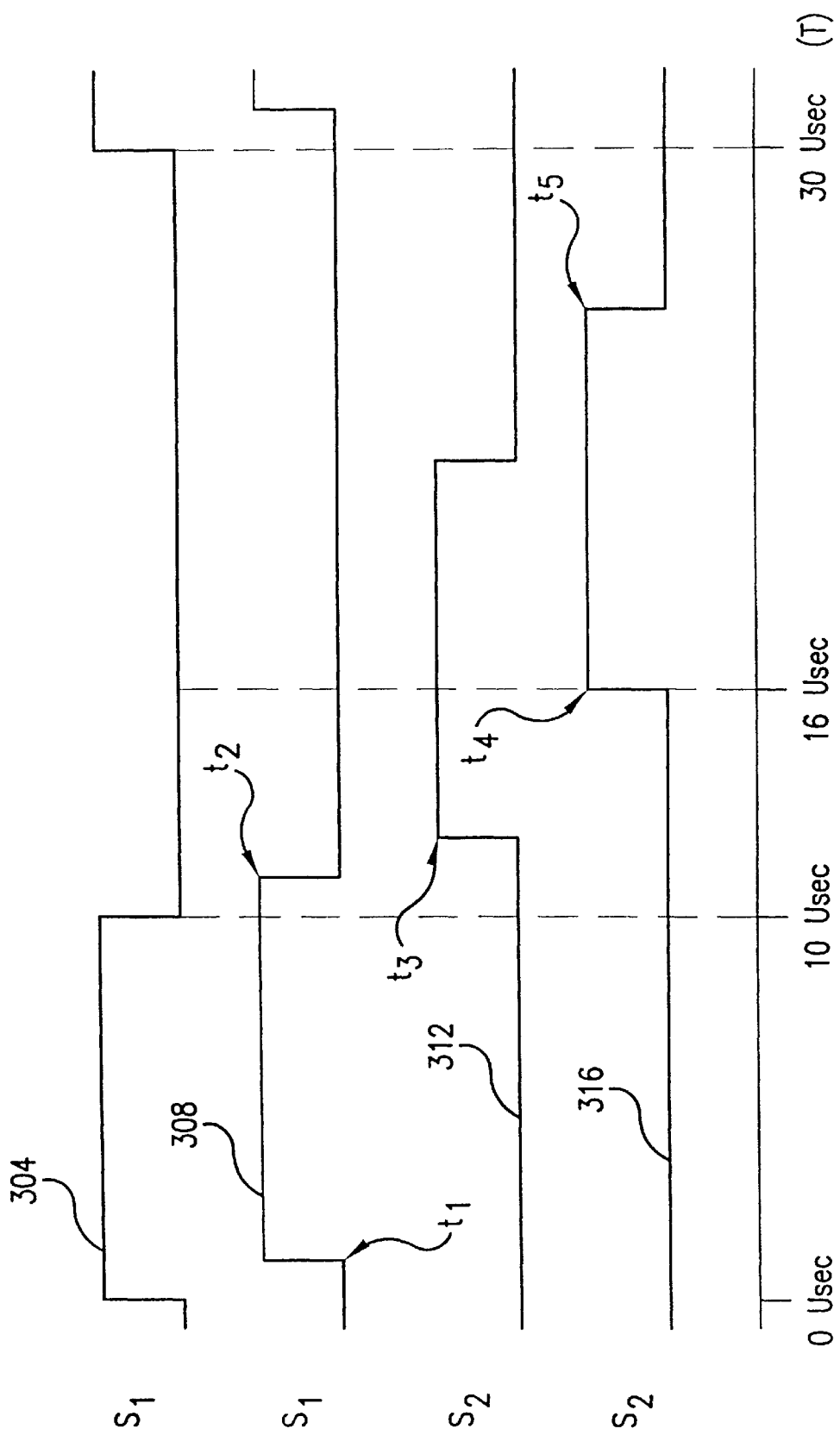
FIG. 3 is an example timing diagram illustrating pulse trains exchanged between the two radio transceivers.

FIG. 3 is an example timing diagram illustrating the pulse trains exchanged between the first radio transceiver 104 and the second radio transceiver 108. In order to simplify the timing diagram, each pulse train is represented by a single pulse. In FIG. 3, time units in the horizontal axis are represented in micro seconds.

Referring now to FIG. 3, at time t=0, the first radio transceiver 104 transmits the pulse train $S_1$ (indicated by a reference numeral 304) using its transmit time base. The pulse train 304 is a periodic pulse train having a time period T. In one embodiment, the pulse train has a period T=30 micro seconds. The pulse train 304 comprises 100 pulses, each pulse having a pulse width of 50 ns. The total width of the pulse train 304 is 10 micro seconds.

At time $t=t_1$, the second radio transceiver 108 begins to receive the pulse train $S_1$ (indicated by a reference numeral 308). In other words, it takes the pulse train $S_1$ a time $t_1$ to travel from the first radio transceiver 104 to the second radio transceiver 108. The second radio transceiver 108 completes the reception of the pulse train $S_1$ at time $t=t_2$, where $t_2=(t_1+10)$ micro seconds. The second radio transceiver 108 synchronizes its time base with the pulse train 308. At time $t=t_3$, the second radio transceiver 108 begins transmission of the pulse train $S_2$ (indicated by a reference numeral 312). At time $t=t_4$, the first radio transceiver 104 begins the reception of the pulse train $S_2$ (indicated by a reference numeral 316).

The first radio transceiver 104 completes the reception of the pulse train 316 at time $t=t_5$, where $t_5=(t_4+10)$ micro seconds.

In the example of FIG. 3, $t_4=16$ micro seconds. The total time of flight for the pulse train $S_1$ to travel from the first radio transceiver 104 to the second radio transceiver 108 and for the pulse train $S_2$ to travel from the second radio transceiver 108 to the first radio transceiver 104 is 6 micro seconds, which is also referred to as the time delay. In the present invention, the time delay is used to calculate the coarse distance and the fine distance.

Figure 4:
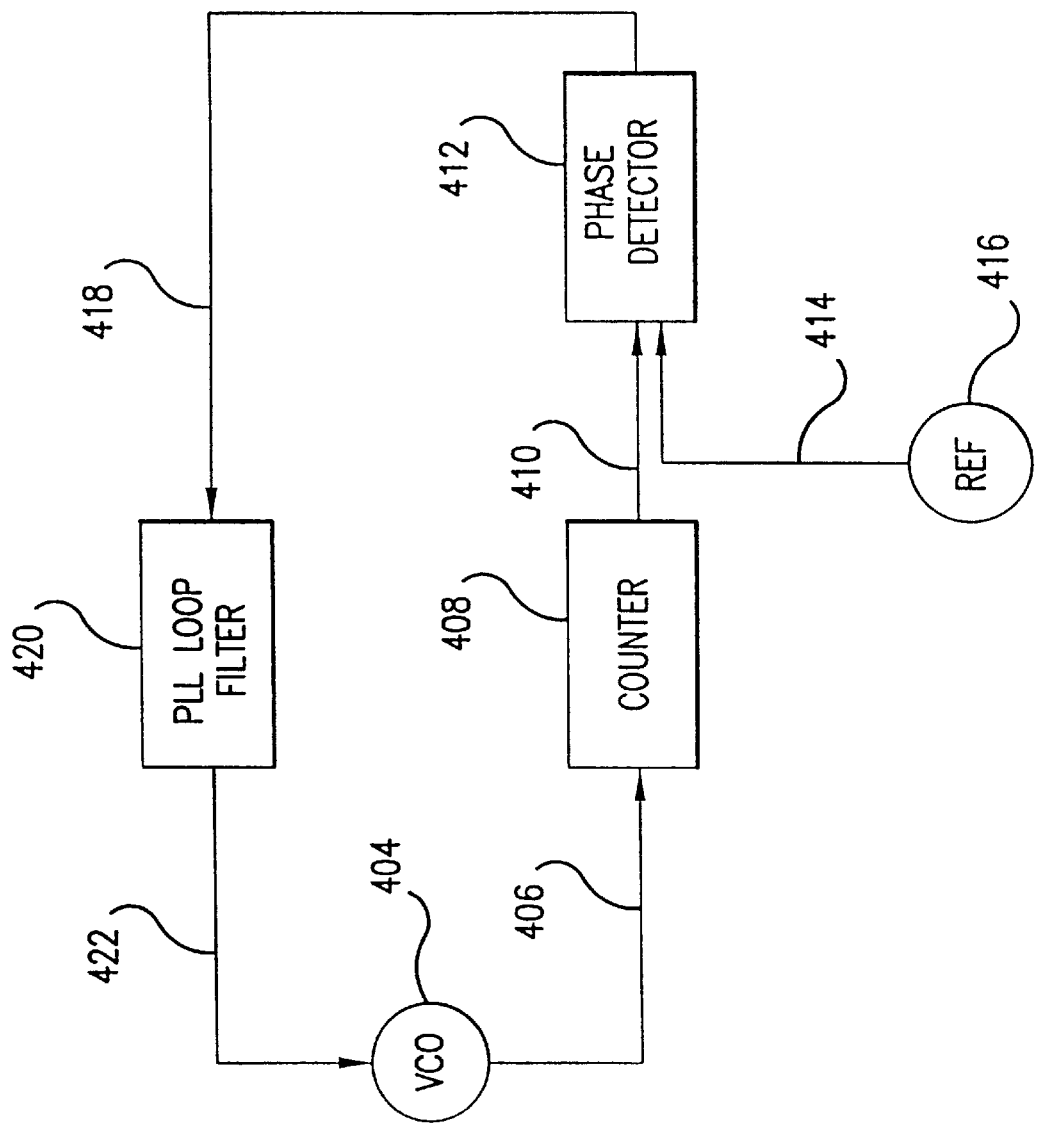
FIG. 4 illustrates a phase locked loop (PLL) circuit that can be used to generate a timing signal.

FIG. 4 illustrates a phase locked loop (PLL) circuit that can be used to generate timing signals at the first radio transceiver 104 and the second radio transceiver 108. The function of the PLL circuit is to synchronize a high frequency oscillator to a stable lower frequency signal source to thereby provide a stable timing signal. The PLL circuit is shown for illustrative purposes only, and it should be apparent to persons skilled in the art that other types of circuits can also be used to provide stable timing signals.

Referring now to FIG. 4, a voltage controlled oscillator 404 generates a base clock signal 406. The base clock signal 406 is divided using a counter 408. The output of the counter (indicated by a reference numeral 410) is received at a phase detector circuit 412. The phase detector circuit 412 also receives a reference signal 414 from a reference signal generator 416. The phase detector circuit 412 outputs a phase difference signal 418. A PLL loop filter 420 receives the phase difference signal 418 and outputs an error signal 422. The error signal 422 is used to adjust the voltage controlled oscillator 404 to thereby provide a stable base clock signal 406. Depending on the application, the base clock signal 406 or the output of the counter 408 can be used as a timing signal.

Coarse Distance Measurement

Figure 5:
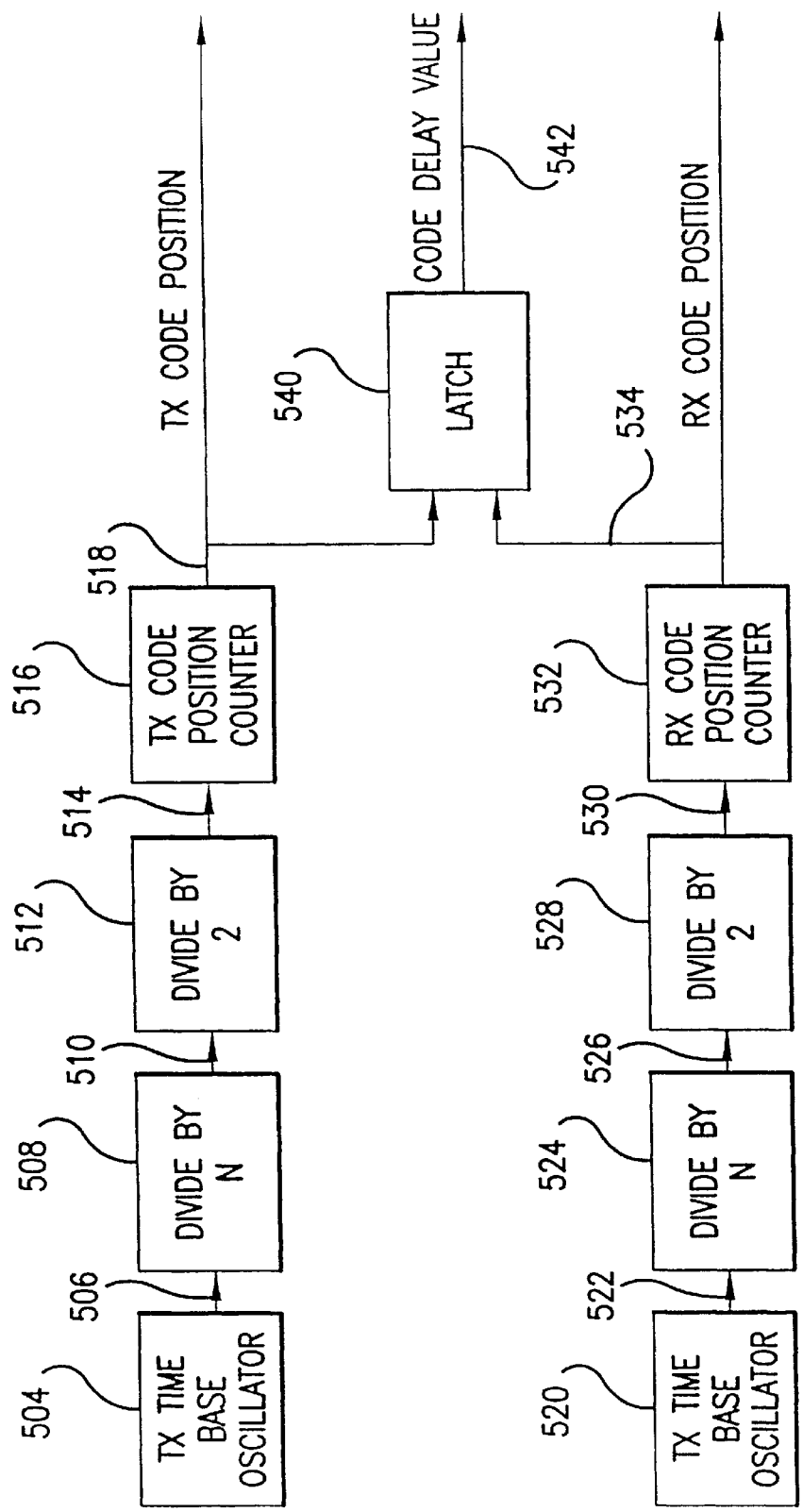
FIG. 5 is a block diagram of a system for determining a coarse distance.

FIG. 5 illustrates a block diagram of a system for determining the coarse distance from the time delay according to one embodiment. Simply stated, the coarse distance indicates the number of pulses counted by a counter during the time delay. In one embodiment, each pulse corresponds to a distance of 100 ft. Thus, for example, if a counter counts 16 pulses during the time delay, the distance traveled by the pulse train is 1600 ft.

Referring now to FIG. 5, a transmit time base 504 is coupled to a counter 508. The counter 508 can be a phase locked loop counter that receives an output 506 from the transmit time base 504 and provides a stable signal referred to as a transmit timing signal 510. In one embodiment, the transmit timing signal 510 is a 10 MHz square wave with a 50% duty cycle.

The transmit timing signal 510 is received at a counter 512, where the transmit timing signal 510 is divided by N, where N is an integer. The counter 512 outputs a first timing signal 514. In one embodiment, N is 2, and consequently, the first timing signal 514 is a 5 MHZ square wave.

The first timing signal 514 is received at a transmit code position counter 516, which counts the number of pulses in the first timing signal 514. In reality, the transmit code position counter 516 counts the number of pulses from the start of the transmission of the pulse train $S_1$ from the first radio transceiver 104. The output of the counter 516 is referred to as a first count value 518, which is a binary number.

Likewise, a receive time base 520 is coupled to a counter 524. The counter 524 receives an output 522 from the receive time base 520 and outputs a receive timing signal 526. In one embodiment, the receive timing signal 526 is a 10 MHZ square wave with a 50% duty cycle.

The receive timing signal 526 is received at a counter 528, where it is divided by N, where N is an integer. The counter 528 outputs a second timing signal 530. In one embodiment, N is 2, and consequently, the second timing signal 530 is a 5 MHz signal.

The second timing signal 530 is received at a receive code position counter 532. The receive code position counter 532 outputs a second count value 534 that indicates the number of pulses counted at the time the transceiver 104 starts to receive the pulse train $S_2$.

The first and second count values (518 and 534, respectively) are received at a latch 540. In one embodiment, the first count value 518 is received at the data input port of the latch 540, while the second count value 534 is received at the "enable" port of the latch 540. The latch 540 outputs a code delay value 542. The code delay value 542 indicates the number of pulses counted between the time the first radio transceiver 104 begins the transmission of the pulse train $S_1$ and the time the first radio transceiver 104 starts to receive the pulse train $S_2$. In other words, the code delay value 542 indicates the sum of the pulses in a pulse train $S_1$ (or $S_2$) and the number of pulses in the time delay. Thus, the number of pulses in the time delay, i.e., the coarse distance, can be calculated by subtracting the number of pulses in a pulse train from the code delay value.

Fine Distance Measurement

Figure 6A:
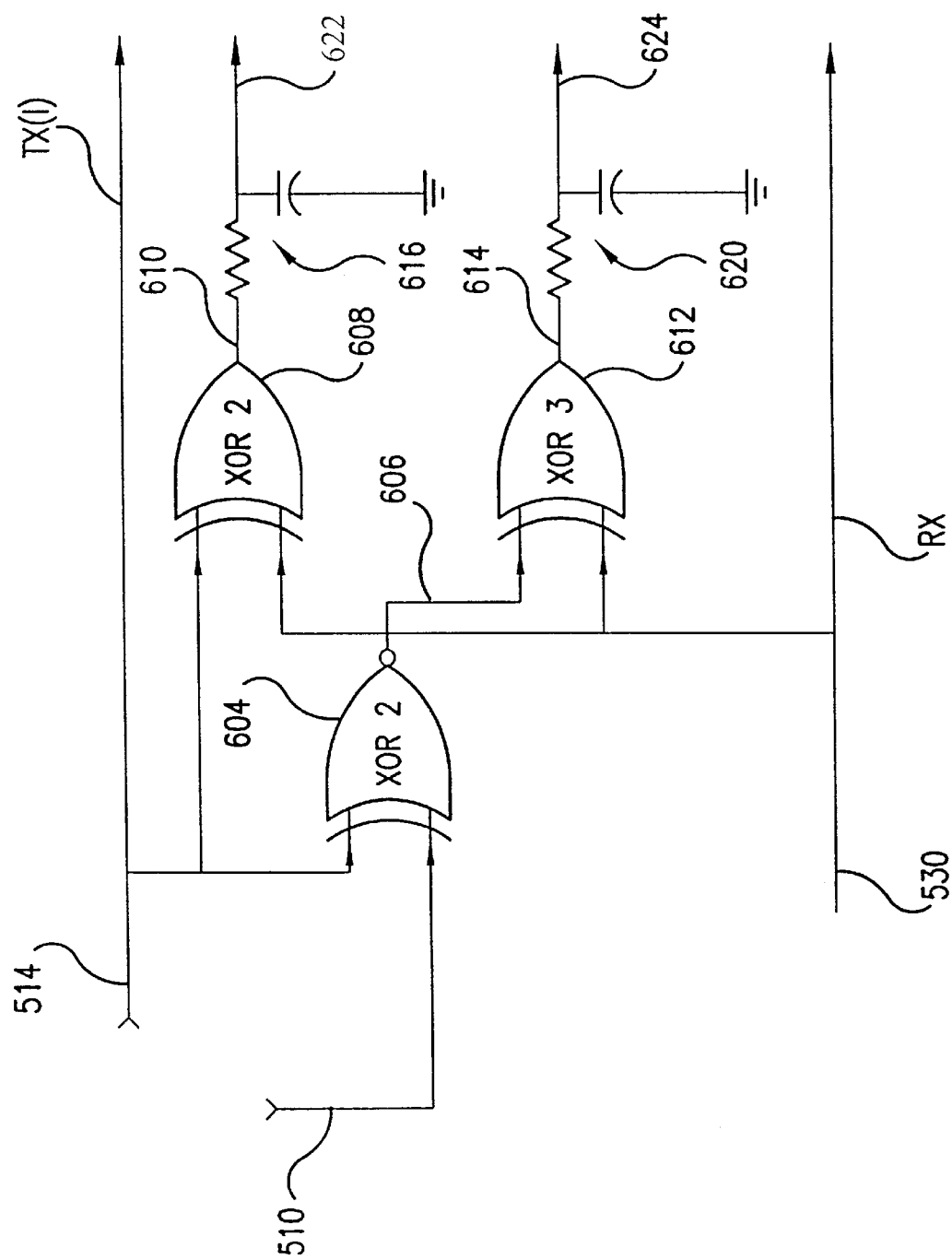
FIGS. 6A and 6B illustrate fine distance measurement circuits.

FIG. 6A illustrates a fine distance measurement circuit according to one embodiment of the present invention. The fine distance measurement circuit receives three inputs: the transmit timing signal 510, the first timing signal 514 and the second timing signal signal 530. These signals have been described in connection with the coarse distance determination in FIG. 5.

The transmit timing signal 510 and the first timing signal 514 are received at a first gate 604. In one embodiment, the first gate is an equivalence gate or an inverted exclusive or (XOR) gate. Also, in one embodiment, the transmit timing signal 519 is a 10 MHz signal, while the first timing signal 514 is a 5 MHz signal. The first timing-signal 514 is also referred to as the TX(I) signal.

The first gate 604 compares the phase of the transmit timing signal 510 to the phase of the TX(I) signal 514 and outputs a TX(Q) signal 606. The duty cycle of the TX(Q) signal 606 is proportional to the phase difference between the transmit timing signal 510 and the TX(I) signal 514.

Figure 6B:
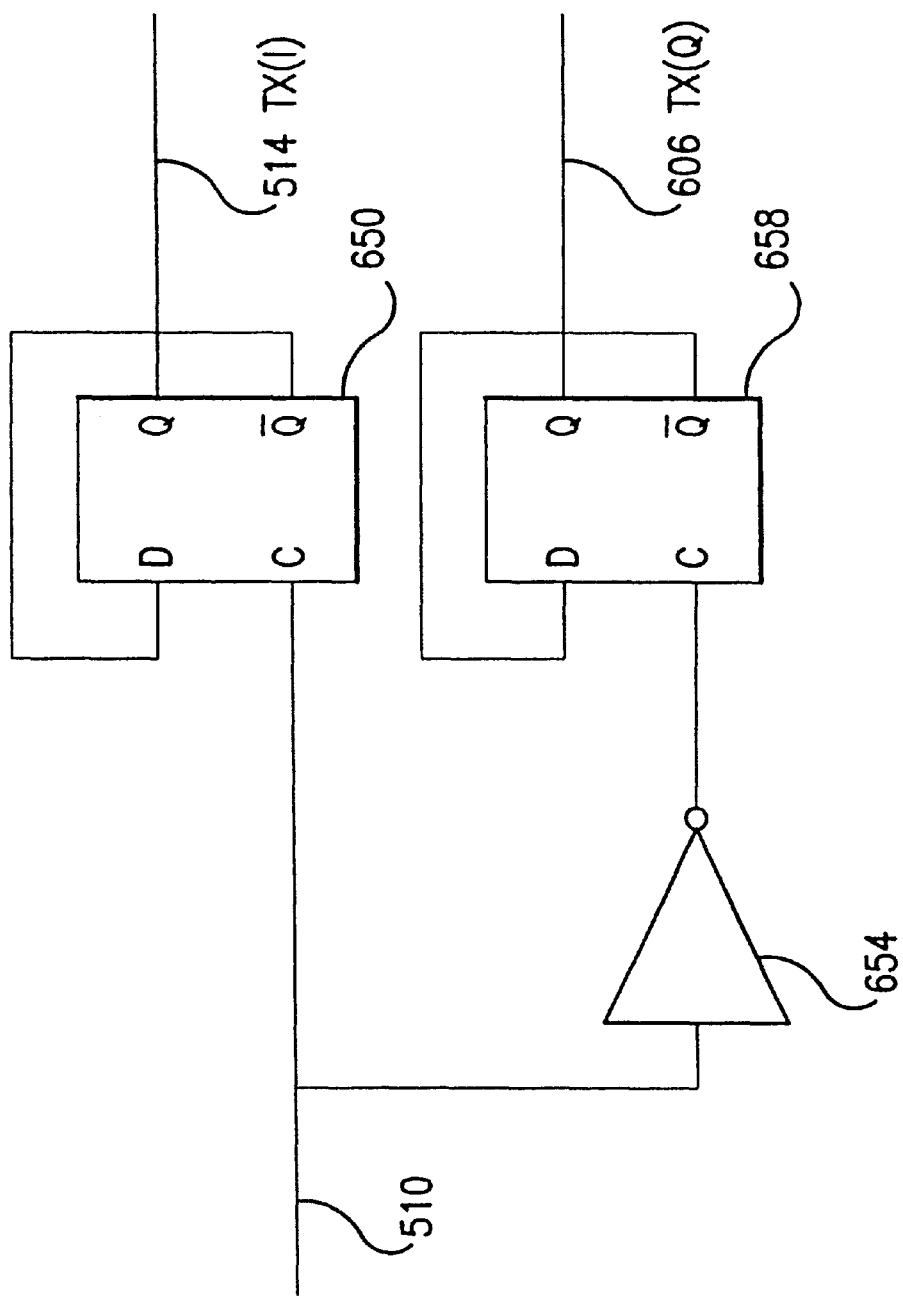

FIG. 6B illustrates an alternate circuit comprising an inverter and two latches for producing the TX(I) signal 514 and the TX(Q) signal 606. The transmit timing signal 510 is received at the latch 650 and the inverter 654. The latch 650 outputs the TX(I) signal 514. The inverter 654 inverts the transmit timing signal 510, which is received by the latch 658. The latch 658 outputs the TX(Q) signal 606. It will become apparent to persons skilled in the art that these signals can be produced by other types of circuits.

Turning again to FIG. 6A, the second timing signal 530 and the TX(I) signal 514 are received at a second gate 608. The second timing signal 530 signal is also referred to as the RX signal signal 530. In one embodiment, the second gate 608 is an exclusive-or gate. The second gate 608 compares the phase of the RX signal signal 530 to the phase of the TX(I) signal 514 and outputs an I signal 610. The I signal 610 has a duty cycle proportional to the phase difference between the TX(I) signal 514 and the RX signal signal 530.

The TX(Q) signal 606 and the RX signal 530 are received at a third gate 612. In one embodiment, the third gate 612 is an X-or gate. The third gate 612 outputs a Q signal 614. The Q signal 614 has a duty cycle proportional to the phase difference between the TX(Q) signal 606 and the RX signal 530.

The I and Q signals (610 and 614, respectively) are received at a first and a second low pass filter 616 and 620, respectively. The first and second low pass filters can each comprise a resistor and a capacitor. Other types of low pass filters can also be used. The first low pass filter 616 removes ac components from the I signal 610 and outputs an $I_{dc}$ signal 622. The $I_{dc}$ signal 622 represents the average dc value of the I signal 610. Likewise, the second low pass filter 620 removes ac components from the Q signal 614 and outputs a $Q_{dc}$ signal 624. The $Q_{dc}$ signal 624 represents the average dc value of the Q signal 614.

Figure 7:
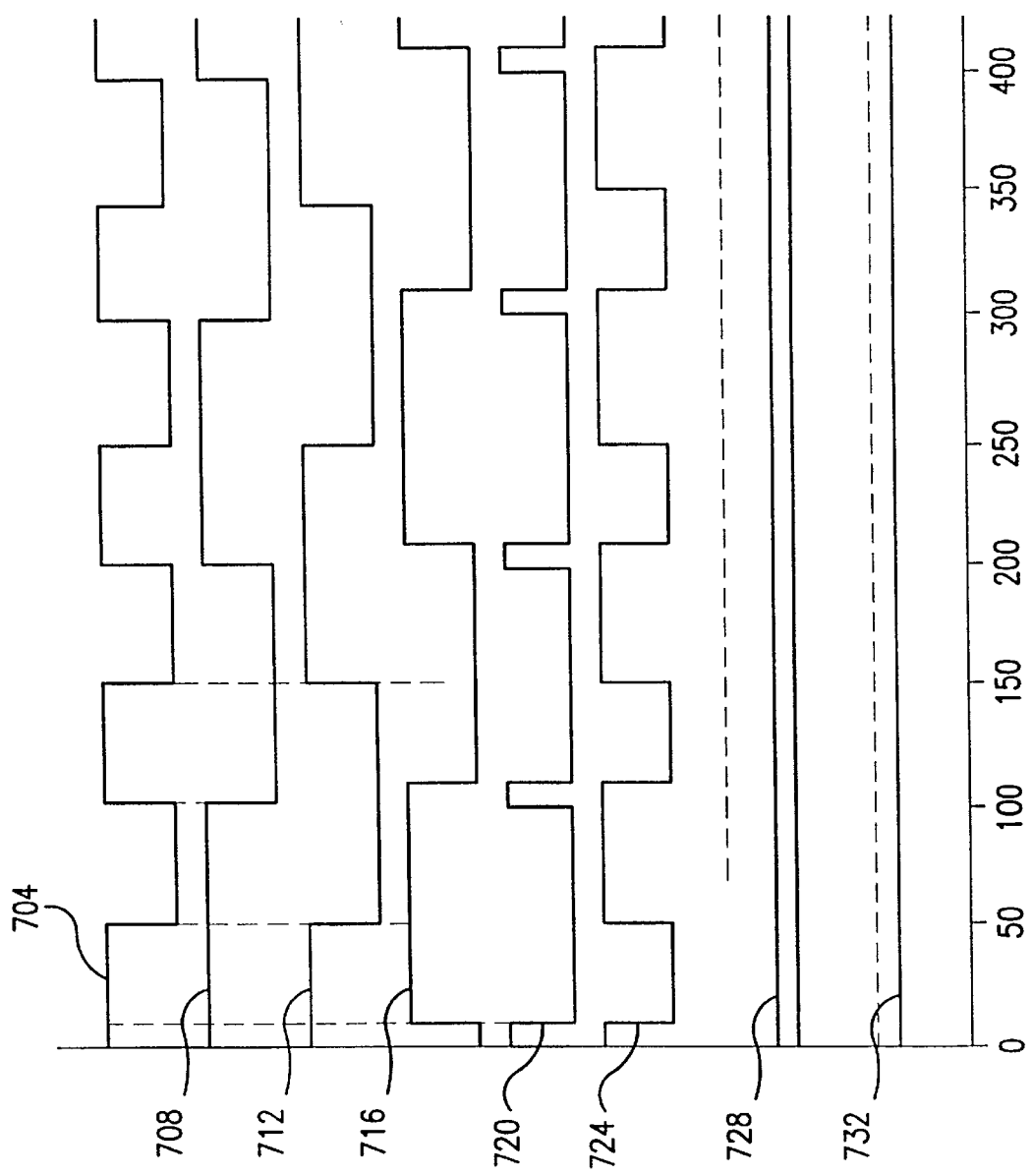
FIG. 7 is a timing diagram for the fine distance measurement.

FIG. 7 is a timing diagram that illustrates the signals referred to in connection with the fine distance measurement circuit of FIG. 6A. The transmit timing signal (indicated by a reference numeral 704) and the TX(I) signal (indicated by a reference numeral 708) are received at the first gate 604. The first gate 604 outputs the TX(Q) signal (indicated by a reference numeral 712). The TX(I) signal and the RX signal (indicated by a reference numeral 716) are received at the second gate 608. The second gate 608 outputs the I signal (indicated by a reference numeral 720). The TX(Q) signal and the RX signal received at the third gate 612. The third gate 612 outputs the Q signal (inidcated by a reference numeral 724). The first low pass filter 616 removes the ac components from the I signal and outputs the $I_{dc}$ signal (indicated by a reference numeral 728). Likewise, the second low pass filter 620 removes the ac components from the Q signal and outputs the $Q_{dc}$ signal (indicated by a reference numeral 732). As described before, the $I_{dc}$ signal 728 and the $Q_{dc}$ signal 732 represent the average dc value of the I signal 720 and the Q signal 724, respectively.

In the present invention, the $I_{dc}$ signal 728 and the $Q_{dc}$ signal 732 are measured as a function of the distance between the first radio transceiver 104 and the second radio transceiver. Stated in other words, a plurality of the $I_{dc}$ signal 728 and the $Q_{dc}$ signal 732 readings are taken as the distance between the first and second radio transceivers (104 and 108, respectively) is varied.

The $I_{dc}$ signal 728 and the $Q_{dc}$ signal 732 are further processed to thereby measure the fine distance. The further processing of the $I_{dc}$ and $Q_{dc}$ signals (728 and 732, respectively) are shown in FIGS. 8 and 9.

Figure 8:
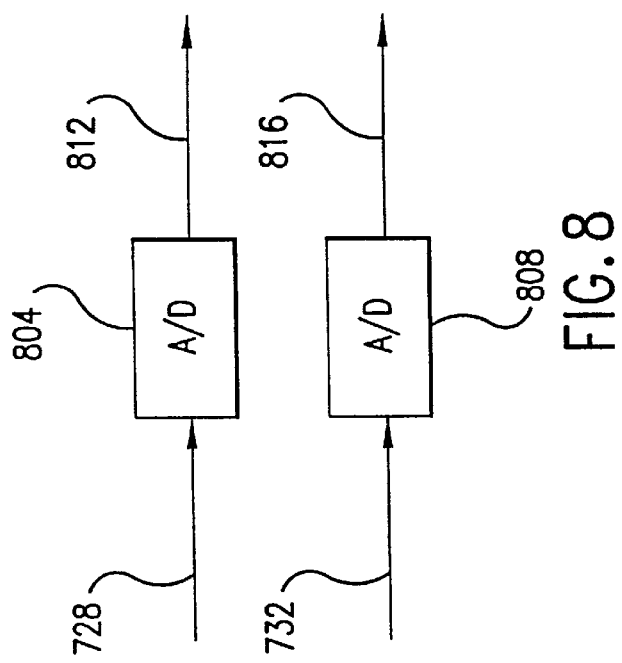
FIG. 8 illustrates two analog to digital (A/D) converters.
Figure 9:
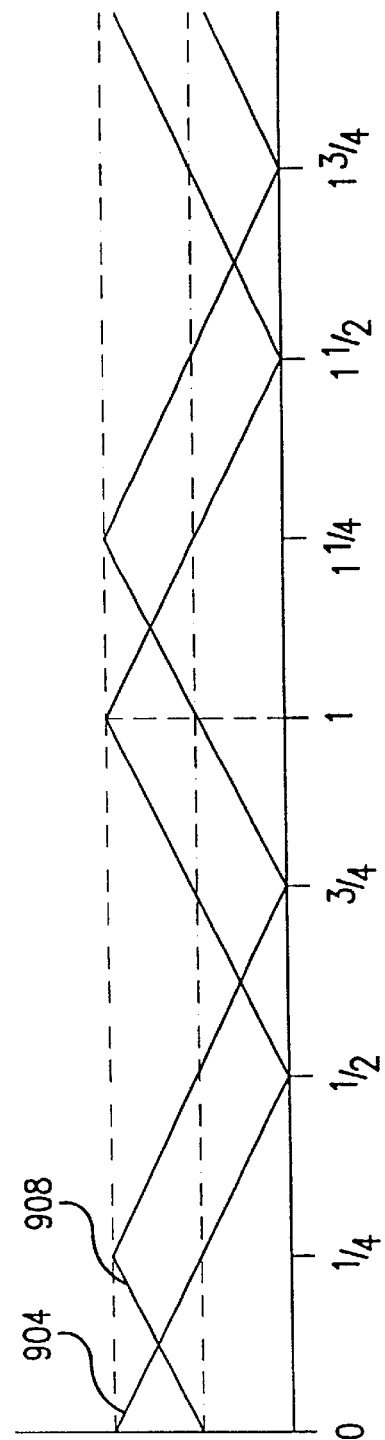
FIG. 9 illustrates two triangular waveforms used for determining the fine distance.

Referring now to FIG. 8, the $I_{dc}$ signal 728 and the $Q_{dc}$ signal 732 are received at analog to digital (A/D) converters 804 and 808, respectively. The A/D converter 804 outputs $I_1$(indicated by a reference numeral 812) and the A/D converter 808 outputs $Q_1$(indicated by a reference numeral 816).

Then, the following values are determined:
$I_{max}$=maximum value of $I_1$;
$I_{min}$=minimum value of $I_1$;
$Q_{max}$=maximum value of $Q_1$;
$Q_{min}$=minimum value of $Q_1$;
$I_{ctr}$=center value of $I_1$; and
$Q_{ctr}$=center value of $Q_1$.
Then, $I_z$ and $Q_z$ variables are computed:

$I_z = I_1 - I_{ctr}$; and $Q_z = (Q_1 - Q_{ctr})*(I_{max} - I_{min})/(Q_{max} - Q_{min})$.

Then, the $I_z$ and $Q_z$ variables are plotted as a function of distance. The above computations shifts the waveforms representing $I_z$ and $Q_z$ to thereby make their center points zero. Also, the above computations equalize the slopes of $I_z$ and $Q_z$.

FIG. 9 illustrates the plots for the $I_z$ and $Q_z$ variables. The $I_z$ variable is represented by a triangular wave 904 and the $Q_z$ variable is represented by a triangular wave 908. The triangular waves 904 and 908 are divided into four quadrants. The ambiguity with respect to the distance given by an actual $I_z$ value is resolved by considering a corresponding $Q_z$ value from FIG. 9.

Then, the octant is determined from Table I.

TABLE I

| Octant | $I_z$ | $Q_z$ |
|---|---|---|
| 0 | + | + |
| 1 | + | − |
| 2 | + | − |
| 3 | + | + |
| 4 | − | + |
| 5 | − | − |
| 6 | − | − |
| 7 | − | + |

Then, an Offset value $O_{off}$ is determined from Table II.

TABLE II

| Octant | Offset Value $O_{off}$ |
|---|---|
| 0 | $Q_z*S$ |
| 1 | $H - I_z*S$ |
| 2 | $-I_z*S$ |
| 3 | $H - Q_z*S$ |
| 4 | $-Q_z*S$ |
| 5 | $H + I_z*S$ |
| 6 | $I_z*S$ |
| 7 | $H - Q_z*S$ | where H is the distance value of one octant, and S is the slope of the $I_z$ waveform. The offset value spans from 0 to H for each octant as the distance scans across the octant. The fine distance is given by $X*H+O_{off}$, where X is the octant number. Then the coarse distance is adjusted as follows.

(a) In octant 1, if the least significant bit (LSB) of the code delay value is 1, then the coarse value is incremented by 1.

(b) In octant 7, if the LSB of the code delay value is zero, then the coarse value is decremented by 1.

Finally, the fine distance is added to the adjusted coarse distance to thereby calculate the total distance.

Applications of the Present Invention

The following applications are described as a few selected examples. It become apparent to persons skilled in the art that the present invention can be utilized in many other applications.

(1) Position Determination

The present invention can be used to determine the position of one or more objects. The objects have fixed locations or can be moving with respect to each other. In one embodiment, a plurality of radios can be combined to provide the position of a desired object (or one or more radios). The actual position can be calculated by triangulation, direction finding antennas or other techniques that are well known in the art. A position determination system based on the present invention can be installed in a mobile phone system (e.g., cellular phone, PCS phone) to thereby provide position information to mobile phone users.

A position determination system built in accordance with the present invention would be more reliable than similar systems based on global positioning satellites (GPS), because the radios in the present invention can be better controlled to provide the desired coverage. Also, such a system based on radios will be more accurate because of the inherent sub-centimeter link accuracy for each link. Also, a position determination system according to the present invention would be superior over an optical system due to its omni-directional antenna pattern and its greater dust and rain resistance.

(2) Distance or Range Measurement for Surveying

The present invention can be utilized for accurate range measurements with sub-centimeter resolution, thereby making the present invention a low cost and less complex alternative to the GPS systems used for high resolution range measurement. Furthermore, the present invention can be used where GPS is unavailable or intermittent, such as in urban areas, in forests or in canyons. Also, the concurrent voice channel available can be used for simultaneous distance measurement and voice communications.

(3) Precision Farming

The present invention can be used to automatically or semi-automatically guide farm equipment with sub-centimeter repeatability and precision. It would not be dependent on satellite constellation as GPS and would be more immune to weather than optical systems. The concurrent data channel can be used for control commands or voice communications.

(4) Mining

Open and underground mining involves operations where GPS is intermittent or not available at all. The present invention can provide reliable and continuous service in these situations. In addition, the multipath immunity of the ultra-wideband (UWB) radio system has been demonstrated to provide excellent communications in underground tunnels where carrier based communication systems fail.

(5) Marine Navigation

The present invention can provide ship to shore link as well as precise full duplex communications. Also, two radios, one at each end of a ship can provide precision docking information.

(6) Asset Tracking

Large shipyards and warehouses have a need for dynamic asset tracking. A system based on the present invention can transmit ID tags and provide link distance as part of an asset position tracking system.

(7) Aircraft Landing

The high precision and rapid measurement rate available from the present invention makes it an ideal sensor for an aircraft precision landing device. Its independence from GPS and immunity to weather make it extremely reliable. Also, multipath immunity makes the present invention insensitive to local propagation conditions and thus extremely portable. As a result, a precision aircraft landing device built in accordance with the present invention can be set up at remote fields in a matter of hours.

(8) Aircraft Collision Avoidance

A collision avoidance system could be built using the present invention. In one embodiment, low cost transponders built according to the present invention can be installed in aircrafts. A simple link between two aircrafts that indicates a steady closing velocity suggests a collision course. A course between two aircraft at a steady velocity that is not a collision course will show a decreasing closing velocity. If additional sensor data is provided on the link, such as altitude, compass, or GPS coordinates, then faster and more accurate predictions of potential collision could be made. The system can operate with or without GPS or interface with ground equipment.

Conclusion

While various embodiments of the present invention have been described above, it should be understood that they have been presented by way of example, and not limitation. Thus the breadth and scope of the present invention should not be limited by any of the above-described exemplary embodiments, but should be defined only in accordance with the following claims and their equivalents.

What is claimed is:

1. A method for distance measurement using a radio system having first and second radio transceivers, said first radio transceiver having a transmit time base and a receive time base and said second radio transceiver having a further time base, comprising the steps of:

transmitting a first pulse train using the transmit time base from the first radio transceiver, the first pulse train having N pulses, where N is an integer number;

receiving the first pulse train at the second radio transceiver and synchronizing its time base with the first pulse train;

transmitting a second pulse train from the second radio transceiver, the second pulse train having N pulses;

receiving the second pulse train at the first radio transceiver and synchronizing the receive time base with the second pulse train;

determining a time delay between the transmit and receive time bases, the time delay indicating the total time of flight of the first and second pulse trains;

determining a coarse distance between the first and second radio transceivers from the time delay, the coarse range distance representative of the distance between the first and second radio transceivers in coarse resolution, by generating a transmit timing signal using the transmit time base; receiving the transmit timing signal at a first latch and outputting a first timing (TX(I)) signal; receiving the TX(I) signal at a first code position counter and outputting a first count value; generating a receive timing signal using the receive time base; dividing the receive timing signal by K at a counter, K being an integer number, and outputting a second timing (RX) signal; receiving the RX signal at a second code position counter and outputting a second count value; receiving the first count value at the data input port of a second latch and the second count value at the enable port of the latch, and outputting a code delay value, and determining a coarse distance value from the code delay value and a base count value, the base count value being representative of the number of pulses in the first or second pulse train;

generating an in-phase (I) and a quadrature (Q) signal from the time delay;

determining a fine distance between the first and second transceivers from the I and Q signals, the fine distance indicating the distance between the first and second transceivers in fine resolution; and determining the distance between the first and second transceivers from the coarse distance and the fine distance.

2. The method of claim 1, wherein the generation of each of said transmit timing signal and receive timing signal comprises the steps of:

generating a base clock signal having a first frequency from a voltage controlled oscillator;

dividing the base clock signal using a counter to a second frequency, the second frequency being lower than the first frequency;

generating a reference signal having the second frequency from a reference signal generator;

determining a phase difference between the divided base clock signal and the reference signal at a phase detector;

receiving the phase difference at a phase locked loop (PLL) filter and outputting an error signal; and receiving the error signal at the voltage controlled oscillator to thereby adjust the voltage controlled oscillator, and wherein said divided base clock signal is utilized as the receive or transmit timing signal.

3. The method of claim 1, wherein said step of determining the fine distance comprises:

receiving the transmit timing signal at an inverter, inverting the transmit timing signal, and outputting an inverted transmit timing signal;

receiving the inverted transmit timing signal at a third latch and outputting a TX(Q) signal, the TX(Q) signal having a duty cycle proportional to the phase difference between the transmit timing signal and the TX(I) signal;

receiving the TX(I) signal and the RX signal at a first gate, comparing the phase of the TX(I) signal to the phase of the RX signal, and outputting the I signal, wherein the I signal has a duty cycle proportional to the phase difference between the TX(I) signal and the RX signal; and receiving the TX(Q) signal and the RX signal at a second gate, comparing the phase of the TX(Q) signal to the phase of the RX signal, and outputting the Q signal, wherein the Q signal has a duty cycle proportional to the phase difference between the TX(Q) signal and the RX signal.

4. The method of claim 3, wherein said step of determining the fine distance further comprises:

receiving the I signal at a first low pass filter, removing the ac component from the I signal, and outputting an $I_{dc}$ signal, the $I_{dc}$ signal having an average dc value of the I signal;

receiving the Q signal at a second low pass filter, removing the ac component from the Q signal, and outputting a $Q_{dc}$ signal having an average dc value of the Q signal; and determining the fine distance from the $I_{dc}$ and $Q_{dc}$ signals.

5. The method of claim 4, wherein said step of determining the fine distance from the $I_{dc}$ and $Q_{dc}$ signals comprises:

receiving the $I_{dc}$ signal at a first analog to digital (A/D) converter and outputting a first digital output having a value between a maximum value and a minimum value;

receiving the $Q_{dc}$ signal at a second analog to digital (A/D) converter and outputting a second digital output having a value between the maximum value and the minimum value; and determining the fine distance from the first and second digital outputs.

6. The method of claim 5, wherein said step of determining the fine distance from the first and second digital outputs comprises:

generating an I triangular waveform from the first digital output; and generating a Q triangular waveform from the second digital output.

7. The method of claim 6, further comprising the steps of:

dividing the I and Q triangular waveforms into four quadrants;

normalizing the I and Q triangular waveforms by a common mid point for the I and Q triangular waveforms; and resolving the ambiguities of the first and second digital outputs from the I and Q triangular waveforms.

8. The method of claim 7, wherein said step of resolving the ambiguities of the first and second digital values comprises:

determining a quadrant location of the range from the I and Q triangular waveforms; and determining the actual distance of the second transceiver from the I triangular waveform.

9. A system for distance measurement using a radio system, comprising:

a first radio transceiver having a first transmit time base for generating a first transmit timing signal and a first receive time base used for generating a first receive timing signal;

a second radio transceiver having a second transmit time base for generating a second transmit timing signal and a second receive time base for generating a second receive timing signal;

a time delay circuit for determining a time delay between the transmit and receive time bases;

a coarse distance measurement circuit for measuring the coarse distance between the first and second radio transceivers from the time delay, the coarse range distance being representative of the distance between the first and second radio transceivers in coarse resolution, comprising a first latch for receiving the transmit timing signal and outputting a first timing signal, TX(I); a first code position counter for receiving the TX(I) signal and outputting a first count value; a counter for dividing the receive timing signal by K, K being an integer, and outputting a second timing RX signal; a second code position counter for receiving the RX signal and outputting a second count value; and a second latch for receiving the first count value and the second count value and outputting a code delay value, wherein the coarse distance is determined from the code delay value and a base count value, the base count value being representative of the number of pulses in the first or second pulse train; and a fine distance measurement circuit for generating an I signal and a Q signal using the time delay and for determining a fine distance between the first and second radio transceivers using the I and Q signals, the fine distance indicating the distance between the first and second transceivers in fine resolution, and wherein the distance between the first radio transceiver and the second radio transceiver is determined from the coarse distance and the fine distance.

10. The system of claim 9, wherein the fine distance measurement circuit comprises:

an inverter for receiving and inverting the transmit timing signal and outputting an inverted transmit timing signal;

a third latch for receiving the inverted transmit timing signal and outputting a TX(Q) signal, the TX(Q) signal having a duty cycle proportional to the phase difference between said transmit timing signal and the TX(I) signal;

a first gate for receiving the TX(I) signal and the RX signal, comparing the phase of the TX(I) signal to the phase of the RX signal, and outputting the I signal, wherein the I signal has a duty cycle proportional to the phase difference between the TX(I) signal and the RX signal; and a second gate for receiving the TX(Q) signal and the RX signal, comparing the phase of the TX(Q) signal to the phase of the RX signal, and outputting the Q signal, wherein the Q signal has a duty cycle proportional to the phase difference between the TX(Q) signal and the RX signal.

11. The system of claim 10, further comprising:

a first low pass filter for receiving the I signal, removing the ac component from the I signal, and outputting an $I_{dc}$ signal, the $I_{dc}$ signal having an average dc value of the I signal;

a second low pass filter for receiving the Q signal, removing the ac component from the Q signal, and outputting a $Q_{dc}$ signal having an average dc value of the Q signal;

a first analog to digital (A/D) converter for receiving the $I_{dc}$ signal and outputting an $I_1$ signal; and a second A/D converter for receiving the $Q_{dc}$ signal and outputting a $Q_1$ signal, and wherein the fine distance is determined from the $I_1$ and $Q_1$ signals.

12. A transceiver for transmitting ultra wideband signals comprising:

a coarse distance measurement circuit to measure a coarse distance between the transceiver and a second transceiver, the coarse distance representing a first distance measurement between the transceiver and the second transceiver in coarse resolution; and a fine distance measurement circuit to measure a fine distance between the transceiver and the second transceiver, the fine distance representing a second distance measurement between the transceiver and the second transceiver in fine resolution; and wherein a final distance measurement between the transceiver and the second transceiver is determined by using the first distance measurement in conjunction with the second distance measurement.

13. The transceiver of claim 12, further comprising:

a transmit time base generator to generate a transmit timing signal;

a receive time base generator to generate a receive timing signal; and a time delay signal generator responsive to the transmit timing signal and to the receive timing signal and outputting a time delay signal; and wherein the first distance measurement is determined using the time delay signal.

14. The transceiver of claim 13, further comprising:

a means for generating a first timing signal, TX(I), using the transmit timing signal;

a means for generating a second timing signal, RX, using the receive timing signal; and a means for generating a third timing signal, TX(Q), using at least one of the transmit timing signal and TX(I).

15. The transceiver of claim 14, further comprising:

an in-phase (I) signal generator responsive to the TX(I) and RX signals;

a quadrature (Q) signal generator responsive to the TX(Q) and RX signals; and a means for determining the second distance measurement using the in-phase (I) signal and the quadrature (Q) signal.

16. The transceiver of claim 15, wherein the means for determining the second distance measurement using the in-phase (I) signal and the quadrature (Q) signal comprises:

a first converter for converting the I signal into a $I_{dc}$ signal having an average dc value of the I signal; and a second converter for converting the Q signal into a $Q_{dc}$ signal having an average dc value of the Q signal; and wherein the second distance measurement is determined using the $I_{dc}$ and $Q_{dc}$ signals.

17. The transceiver of claim 16, wherein the first converter comprises:

a low pass filter for receiving the I signal, removing the ac component from the I signal, and outputting said $I_{dc}$ signal.

18. The transceiver of claim 16, wherein the second converter comprises:

a low pass filter for receiving the Q signal, removing the ac component from the Q signal, and outputting said $Q_{dc}$ signal.

19. The transceiver of claim 16, wherein the means for determining the second distance measurement comprises:

a first A/D converter responsive to the $I_{dc}$ signal and outputting a first digital output ($I_1$) signal; and a second A/D converter responsive to the $Q_{dc}$ signal and outputting a second digital output ($Q_1$) signal; and wherein the second distance measurement is determined using the $I_1$ and $Q_1$ signals.

20. The transceiver of claim 19, further comprising:

a processor for evaluating an $I_z$ variable from the $I_1$ signal and a $Q_z$ variable from the $Q_1$ signal, wherein the $I_z$ and $Q_z$ variables are evaluated as a function of distance.

21. A transceiver for transmitting ultra wideband signals comprising:

a coarse distance measurement circuit to measure a coarse distance between the transceiver and a second transceiver, the coarse distance representing a distance between the transceiver and the second transceiver in coarse resolution comprising a transmit time base generator to generate a transmit timing signal; a receive time base generator to generate a receive timing signal; and a time delay signal generator responsive to the transmit timing signal and to the receive timing signal and outputting a time delay signal wherein the coarse distance is determined using the time delay signal; and a fine distance measurement circuit to measure a fine distance between the transceiver and the second transceiver, the fine distance representing the distance between the transceiver and the second transceiver in fine resolution comprising a means for generating a first timing signal, TX(I), using the transmit timing signal, a means for generating a second timing signal, RX, using the receive timing signal and a means for generating a third timing signal, TX(Q), using at least one of the transmit timing signal and TX(I); and wherein the distance between the transceiver and the second transceiver is determined using the coarse distance and the fine distance.

22. The transceiver of claim 21, further comprising:

an in-phase (I) signal generator responsive to the TX(I) and RX signals;

a quadrature (Q) signal generator responsive to the TX(Q) and RX signals; and a means for determining the fine distance using the in-phase (I) signal and the quadrature (Q) signal.

23. The transceiver of claim 22, wherein the means for determining the fine distance using the in-phase (I) signal and the quadrature (Q) signal comprises:

a first converter for converting the I signal into a $I_{dc}$ signal having an average dc value of the I signal; and a second converter for converting the Q signal into a $Q_{dc}$ signal having an average dc value of the Q signal; and wherein the fine distance is determined using the $I_{dc}$ and $Q_{dc}$ signals.

24. The transceiver of claim 23, wherein the first converter comprises:

a low pass filter for receiving the I signal, removing the ac component from the I signal, and outputting said $I_{dc}$ signal.

25. The transceiver of claim 24, wherein the second converter comprises:

a low pass filter for receiving the Q signal, removing the ac component from the Q signal, and outputting said $Q_{dc}$ signal.

26. The transceiver of claim 25, wherein the means for determining the fine distance comprises:

a first A/D converter responsive to the $II_{dc}$ signal and outputting a first digital output ($I_1$) signal; and a second A/D converter responsive to the $Q_{dc}$ signal and outputting a second digital output ($Q_1$) signal; and wherein the fine distance is determined using the $I_1$ and $Q_1$ signals.

27. The transceiver of claim 26, further comprising:

a processor for evaluating an $I_z$ variable from the $I_1$ signal and a $Q_z$ variable from the $Q_1$ signal, wherein the $I_z$ and $Q_z$ variables are evaluated as a function of distance.

* * * * *

UNITED STATES PATENT AND TRADEMARK OFFICE
CERTIFICATE OF CORRECTION

| | | |
|---|---|---|
| PATENT NO. | : 6,674,396 B2 | Page 1 of 1 |
| APPLICATION NO. | : 09/960278 | |
| DATED | : January 6, 2004 | |
| INVENTOR(S) | : James L. Richards et al. | |

It is certified that error appears in the above-identified patent and that said Letters Patent is hereby corrected as shown below:

On Title Page, Item (75) after "AL (US)" insert --David C. MEIGS, Huntsville, Al; Randall S. STANLEY, Madison, AL; Ivan A. COWIE, Madison, AL--.

Signed and Sealed this

Sixth Day of February, 2007

JON W. DUDAS
*Director of the United States Patent and Trademark Office*